April 19, 1955   J. R. HOLLINS   2,706,809
VEHICLE SIGNALLING CIRCUIT
Filed May 7, 1952
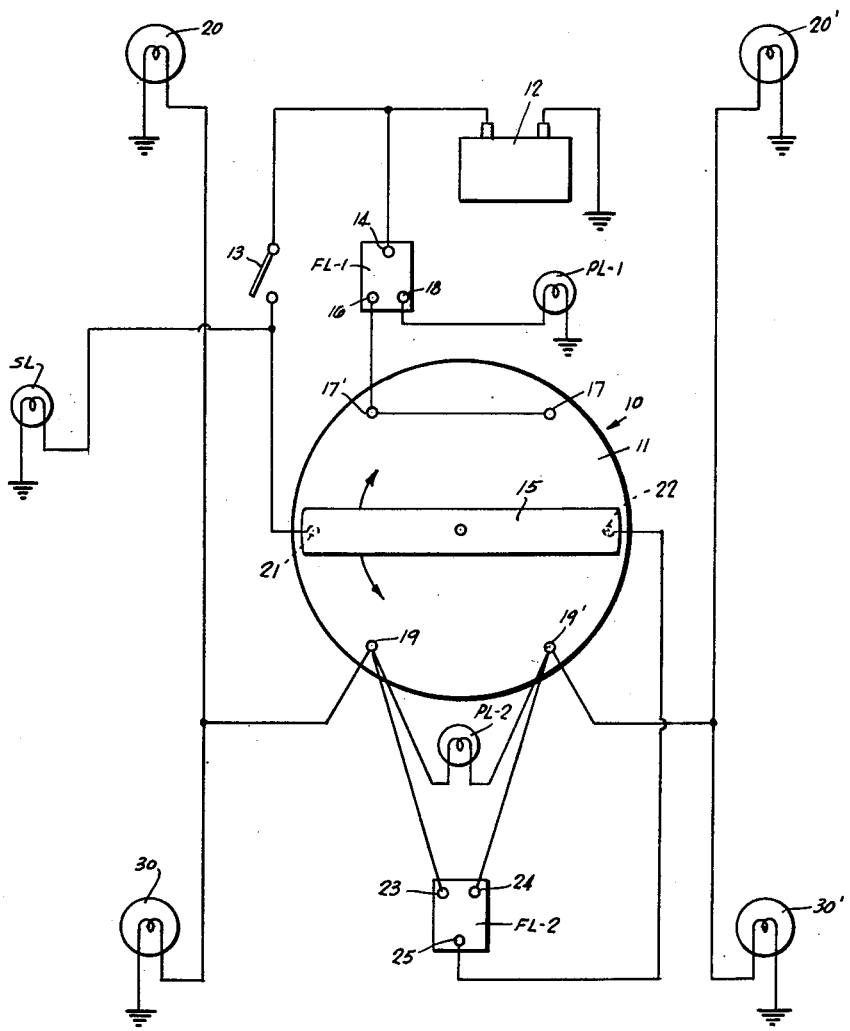
INVENTOR.
Jesse R Hollins
BY
Dan J Mount
ATTORNEY

United States Patent Office 2,706,809
Patented Apr. 19, 1955

2,706,809

VEHICLE SIGNALLING CIRCUIT

Jesse R. Hollins, Brooklyn, N. Y.

Application May 7, 1952, Serial No. 286,500

4 Claims. (Cl. 340—81)

This invention relates to signalling systems for vehicles, particularly of the automotive type, and more particularly to a novel signalling circuit whereby turn indicating signal lamps are caused to flash whenever the brake-operated stop lamp switch is closed to augment the "stop" signal provided by the usual "stop" lamp or lamps.

The usual stop lamp now standard equipment on most motor vehicles, and energized whenever the brake pedal is operated to decelerate the vehicle, is generally a steady burning lamp. However, a steady burning lamp is not as effective in attracting a driver's attention as is a flashing lamp. Flashing lamps are usually provided as turn signalling indicators on most vehicles, being selectively energized to flash a turn indication by a selector switch mounted on the steering column.

The present invention is directed to a novel signalling arrangement employing turn signal lamps as flashing "stop" lamps augmenting the usual steady burning "stop" lamp or lamps. To this end, a second flasher is connected between the brake pedal operated stop lamp switch and the signal lamps on both sides of the vehicle. This second flasher circuit is in parallel with the usual stop lamp circuit and serves to flash both turn indicating lamps when the brake pedal operated switch is closed. Preferably, the second flasher is an alternating flasher arranged to flash the turn signal lamps in alternation. Thus, both the steady burning stop lamp and alternately flashing "turn" lamps are simultaneously energized to signal slowing or stopping of the vehicle.

For an understanding of the invention principles, reference is made to the following description and accompanying drawing in which the single figure is a schematic circuit diagram of the invention signalling circuit.

Referring to the drawing, a turn indicator selector switch 10 is illustrated as selectively operable to energize either the left signal lamps 20, 30 or the right signal lamps 20', 30' mounted on the front and rear of the vehicle. Energization of the turn signal lamps, such as 20, 20', is selectively effected by means of a contact arm 15 rotatably mounted on a dielectric base 11 carrying contacts connected to the turn signal lamps. The latter are grounded on one side, in the usual manner, and are energized from the grounded vehicle battery (and/or generator) 12 over a circuit including a first flasher FL-1 in series with battery 12.

The vehicle is also provided with the usual steady burning stop lamp SL also energized from battery 12, whenever a switch 13 is closed. Switch 13 is the usual brake operated stop lamp switch.

In the arrangement shown, flasher FL-1 has its input terminal 14 connected to battery 12, and its main output 16 connected to contacts 17, 17' on base 11. An auxiliary output terminal 18 is connected to grounded pilot lamp PL-1. Left lamps 20, 30 are connected in parallel to contact 19 diametrically opposite contact 17, and right lamps 20', 30' are connected in parallel to contact 19' diametrically opposite contact 17'. A second pilot lamp PL-2 is connected between contacts 19, 19'.

Assuming it is desired to signal a left turn, arm 15 is turned counter-clockwise to interconnect contacts 17 and 19. This connects lamps 20, 30 to battery 12 through flasher FL-1, and the lamps flashed to indicate a left turn. Pilot lamp PL-1 is flashed through flasher contact 18. Pilot lamp PL-2 is flashed, in alternation with the signal lamps, through lamps 20', 30', but the high resistance of lamp PL-2 prevents a current flow sufficient to illuminate lamps 20', 30'. A right turn is signalled in a corresponding manner.

In accordance with the invention, base 11 is provided with an extra pair of contacts 21, 22 engaged and interconnected by arm 15 only when the latter is in the off or neutral position. Contact 21 is connected to the stop lamp terminal of switch 13, in parallel with stop lamp SL. Contact 22 is connected to the "live" or input terminal 25 of a second flasher FL-2, preferably arranged to alternately energize its output terminals 23, 24. These latter are respectively connected to switch contacts 19, 19'.

With switch 10 in the neutral position shown, if the brake pedal is operated, switch 13 is closed to energize stop lamp SL. Simultaneously, flasher FL-2 is energized through arm 15 and contacts 21, 22 to alternately flash left lamps 20, 30 and right lamps 20', 30'. Pilot lamp PL-1 is not energized, but pilot lamp PL-2 is flashed as described above. Thus, the turn signal lamps at both the front and rear of the vehicle are flashed to warn of a stop. This arrangement is particularly advantageous for school buses and similar vehicles.

Thus, whenever the brakes are applied with switch 10 in the neutral position, all of the turn signal lamps are flashed in right and left alternation to augment the signalling effect of "steady" stop lamp SL. However, this circuit is immediately rendered inoperative whenever switch 10 is operated to signal a turn as, with either a right or left turn being signalled, arm 15 is disengaged from contacts 21, 22.

While a specific embodiment of the invention has been shown and described in detail to illustrate the application of the invention principles, it will be understood that the invention may be embodied otherwise without departing from such principles.

What is claimed is:

1. In a vehicle having a source of electric energy, a stop lamp, a brake-operated switch controlling energization of said stop lamp from said source, front and rear mounted pairs of, turn signalling lamps, the lamps of each pair being mounted on opposite sides of the vehicle, a flasher connected to said source, and a selector switch having contacts and a switch arm selectively operable to connect said signal lamps to said flasher for selectively flashing a right turn or a left turn, the combination of a second flasher having a pair of output terminals respectively connected to a pair of left signal lamps and a pair of right signal lamps; and means, including selector switch contacts independent of the signal lamp contacts and engaged by the switch arm only in the neutral position of said selector switch, operable upon actuation of said brake-operated switch to connect said second flasher to said source in parallel with said stop lamp to flash all of the signal lamps when said stop lamp is illuminated to augment the signalling effect of said stop lamp at the rear of the vehicle and to provide, at the front of the vehicle, a signal indication of the application of the vehicle brakes.

2. In a vehicle having a source of electric energy, a stop lamp, a brake-operated switch controlling energization of said stop lamp from said source, front and rear mounted pairs of, turn signalling lamps, the lamps of each pair being mounted on opposite sides of the vehicle, a flasher connected to said source, and a selector switch having contacts and a switch arm selectively operable to connect said signal lamps to said flasher for selectively flashing a right turn or a left turn, the combination of a second flasher having a pair of output terminals respectively connected to a pair of left signal lamps and a pair of right signal lamps; and means, including said selector switch in a selected position, operable to connect said second flasher to said brake-operated switch in parallel with said stop lamp to flash all of the signal lamps when said stop lamp is illuminated to augment the signalling effect of said stop lamp at the rear of the vehicle and to provide, at the front of the vehicle, a signal indication of the application of the vehicle brakes.

3. In a vehicle having a source of electric energy, a stop lamp, a brake-operated switch controlling connection of said stop lamp to said source, left and right front signal lamps, and left and right rear signal lamps, the combination of a selector switch having a movable switch arm, a first pair of contacts, and a second pair of contacts each opposite a contact of said first pair and one connected to the left signal lamps and the other connected to the right signal lamps; a flasher connected between said source and both contacts of said first pair; said arm being selectively operable to connect either contact of said second pair to the opposite contact of said first pair to flashingly energize either the left or the right signal lamps; a third pair of contacts on said switch interconnected by said arm only in the neutral position of said switch, one of said third pair of contacts being connected to said brake operated switch in parallel with said stop lamp; and a second flasher having a pair of output terminals each connected to a contact of said second pair and an input terminal connected to the other of said third pair of contacts; whereby, when said switch arms is in the neutral position and the brake is operated, all the signal lamps are flashed while said stop lamp is illuminated to augment the signalling effect of said stop lamp at the rear of the vehicle and to provide, at the front of the vehicle, a signal indication of the application of the vehicle brakes.

4. In a vehicle having a source of electric energy, a stop lamp, a brake-operated switch controlling connection of said stop lamp to said source, left and right front signal lamps, and left and right rear signal lamps, the combination of a selector switch having a movable switch arm, a first pair of contacts, and a second pair of contacts each opposite a contact of said first pair and one connected to the left signal lamps and the other connected to the right signal lamps; a flasher connected between said source and both contacts of said first pair; said arm being selectively operable to connect either contact of said second pair to the opposite contact of said first pair to flashingly energize either the left or the right signal lamps; a third pair of contacts on said switch interconnected by said arm only in the neutral position of said switch, one of said third pair of contacts being connected to said brake operated switch in parallel with said stop lamp; and a second flasher having a pair of alternately energizable output terminals each connected to a contact of said second pair and an input terminal connected to the other of said third pair of contacts; whereby, when said switch arm is in the neutral position and the brake is operated, all the signal lamps are flashed alternately while said stop lamp is illuminated to augment the signalling effect of said stop lamp at the rear of the vehicle and to provide, at the front of the vehicle, a signal indication of the application of the vehicle brakes.

References Cited in the file of this patent

UNITED STATES PATENTS

| | | |
|---|---|---|
| 2,090,332 | O'Neill | Aug. 17, 1937 |
| 2,122,508 | Bell | July 5, 1938 |
| 2,124,829 | Rioux | July 26, 1938 |
| 2,300,896 | Rosmer | Nov. 3, 1942 |
| 2,654,079 | Ringwald | Sept. 29, 1953 |